United States Patent [19]

Garoutte

[11] 4,048,392

[45] Sept. 13, 1977

[54] CRIMP SEAL USING POLYPHENYLENE SULFIDE PLASTIC WITH AN ALUMINUM TERMINAL PAN

[75] Inventor: Kurt F. Garoutte, Furlong, Pa.

[73] Assignee: Honeywell Inc., Minneapolis, Minn.

[21] Appl. No.: 749,950

[22] Filed: Dec. 13, 1976

[51] Int. Cl.² ............... H01M 2/30; H01M 10/38
[52] U.S. Cl. ........................... 429/105; 429/181;
429/184; 429/185; 429/194; 429/199
[58] Field of Search .............. 429/178, 181, 184, 185,
429/101, 105, 218; 339/94 A, 126 RS

[56] References Cited

U.S. PATENT DOCUMENTS

| 2,744,217 | 5/1956 | Aikman | 429/181 X |
|---|---|---|---|
| 2,926,210 | 2/1960 | Sturges | 339/94 A |
| 3,427,205 | 2/1969 | Plitt et al. | 429/181 X |
| 3,826,687 | 7/1974 | Dey | 429/184 |
| 4,006,282 | 2/1977 | Antoine | 429/181 |

Primary Examiner—Anthony Skapars
Attorney, Agent, or Firm—John S. Munday

[57] ABSTRACT

The terminal pin assembly for a battery including an elongated cylindrical pin having a first end for extension exterior of the battery and a second end for extension interior of the battery where the second end has a larger cross-sectional area than the first end. Header means are included forming one end of the battery and defining an opening through which the pin extends such that the opening has a diameter larger than the first end of the pin. Bracket means are mounted on the interior side of the surface of the header means and extend inward from the surface, with the bracket means having a diameter larger than the opening in the header means. Sealing means are provided and are mounted on the exterior end of the pin and have a diameter essentially equal to the bracket means, whereby the bracket means is forceably enclosed about the sealing means. The preferred sealing means comprises a toroid-shaped member slideably mounted on the pin such that the inner diameter of the toroid is essentially the same as the first end and the outer diameter of the toroid is essentially the same as the bracket means diameter. A preferred material for the toroid shaped member is polyphenylene sulfide polymer. Most preferred are polyphenylene sulfide polymers which contain from 10 to 60 percent by weight of a fiberglass fill and from 10 to 40 percent by weight of a polytetrafluroethylene fill.

15 Claims, 1 Drawing Figure

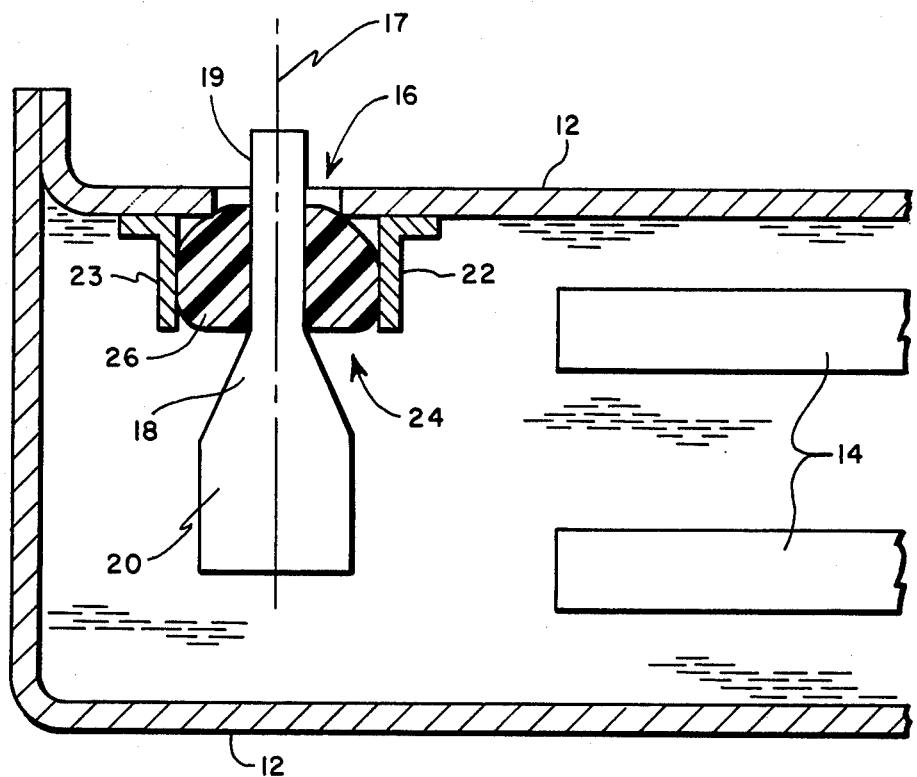

CRIMP SEAL USING POLYPHENYLENE SULFIDE PLASTIC WITH AN ALUMINUM TERMINAL PAN

BACKGROUND OF THE INVENTION

As the evolution of batteries continues, and particular as lithium batteries become more widely accepted for a variety of uses, the need for a safe, long-lasting, high energy battery becomes more important. Various exotic chemistries are available which are capable of producing high-voltage and large quantities of current. Nevertheless, while electrochemistries exist which are capable of producing desired results, if these systems are incapable of being economically and effectively packaged to permit long-term shelf life, and continued operation over the theoretical life of the system, they are of little value. Laboratory curiosities have little utility until they are developed and engineered to the point where a safe and effective product can be manufactured for sale.

One particular problem lies in the area of battery terminals, which are absolutely essential if these exotic chemistries are to be able to discharge the much desired quantities of energy and power. As with higher energy systems, the very nature of the high electrochemical potential presents problems with side reactions, corrosion and incompatibility of materials. In particular materials such as sulfur dioxide which are employed as depolarizers are found to be highly corrosive, vigorously attacking most metals which are employed at the terminal pin. By far the most effective material for use as a terminal pin in these types of batteries is aluminum. Aluminum very fortunately has the desirable property of being compatible with lithium sulfur dioxide chemistries so that an aluminum terminal pin will not corrode or be otherwise adversely affected by the system. However, aluminum is not without other properties which cause difficulties in the manufacture of an acceptable commercial product. Sulfur dioxide systems are, by their nature, pressurized, which require an effective and complete seal of the terminal pin as it passes from the inside of the cell to the exterior. By far the most effective type of seal would be a glass to metal seal which would be hermetic and protect the user from noxious sulfur dioxide. Aluminum, unfortunately, is incapable of withstanding the temperatures necessary for the formation of a glass to metal seal.

Accordingly, it is an object of this invention to provide a seal for a battery terminal pin which employs an aluminum metal or metal alloy thereof in a manner which prevents escape of the sulfure dioxide. A further object of this invention is to provide a seal means for a lithium-sulfur dioxide battery which does not employ high temperatures, thereby permitting the use of aluminum terminal pin. Other objects will appear hereinafter.

BRIEF DESCRIPTION OF THE INVENTION

The above and other objects in this invention can be accomplished in the following manner. Specifically, it has been found that a terminal pin assembly can be made comprising an elongated cylindrical pin having a first end for extension exterior of the battery and a second end for extension interior of the battery, said second end having a larger cross-sectional area than the first end. Also provided are header means forming one end of the battery and defining an opening through which the pin extends, said opening having a diameter larger than the first end of the pin. Attached to the interior surface of the header means and extending inward therefrom is a bracket means, the bracket means having a diameter larger than the opening in the header means. Finally, sealing means are mounted on the exterior end of the pin at a point interior of the header means and having a diameter essentially equal to the bracket means. The bracket means are then forceably enclosed about the sealing means in the manner of a crimping. Particularly preferred as a material for the terminal pin is aluminum. In a preferred embodiment, the sealing means comprises a toroid shaped member slideably mounted on the pin such that the inter-diameter of the pin is essentially the same as the first end of the pin and the outer diameter of the toroid is essentially the same as the bracket means of diameter. A preferred material for the toroid shaped member is polyphenylene sulfide. It is a preferred embodiment to include a quantity of from 10 to 60 percent by weight of a fiberglass fill, and preferably from thirty to forty percent by weight fiberglass. Also preferred is to include from 10 to 40 percent by weight of polytetrafluroethylene fill. And yet another embodiment of the present invention, the interior portion of the terminal pin can be flattened from a cylindrical piece of aluminum stock by flattening the interior portion of the aluminum pin, a surface is provided which can be cut into a grid, thereby providing a matrix for attachment of the lithium metal anode of the electrochemical system.

DETAILED DESCRIPTION OF THE INVENTION

For a more complete understanding of the invention, reference is hereby made to the drawing, in which the FIGURE represents a partially sectioned schematic view of a battery employing the concepts of the present invention.

As shown in the FIGURE, a battery case 10 has a header 12 forming one end of the battery. Various cathodes 14 are present in this system, which, for the purpose of example, may be a lithium-sulfur dioxide cell in which lithium acts as the anode and sulfur dioxide is the depolarizer. An electrolyte system such as various salts such as lithium hexafluro arsenate and lithium bromide may be dissolved in various inner organic solvents such as acetonitrile or merely dissolved in liquified sulfur dioxide, which functions both as a solvent or prosolvent as a depolarizer. Carbon or other materials may act as a cathode collector, which material is effectively sealed.

The header plate 12 defines a hole 16 which is centered about axis 17 and permits access into the battery by terminal pin. A terminal pin 18 is centered about axis 17, with a portion 19 extending exterior of the battery and a second interior portion 20 on the inside of the battery. One piece bracket means 22 and 23 is mounted on the interior surface of the header 12 and extend into the battery, defining a diameter of hole 24 which is greater than the diameter of hole 16. A sealing means 26, which in this example is a toroid shaped member, is attached to the exterior end 19 of the terminal pin 18. The interior diameter of the sealing means 26 is the same essentially as that of the exterior end 19 of pin 18. The outer diameter of the sealing means 26 is essentially the same as the diameter of the hole 24 defined by the bracket means 22 and 23. To completely and effectively seal the terminal pin 18 in the battery pin, the ends of bracket 22 and 23 are crimped towards the access 17 to forceably restrain the sealing means 26.

As has been stated above, aluminum is an effective material for use as a terminal pin when sulfur dioxide is employed as a depolarizer in lithium battery. Various electrolyte systems may be employed such as, by way of example, electrolyte salts such as lithium, hexafluroarsenate or lithium bromide dissolved in either sulfur dioxide alone or with an organic co-solvent such as acetronitrile. Carbon is normally employed as a cathode collector and that material is quite suitable for bonding to external pins without the use of aluminum, thereby insuring an adequate seal to the environment.

A number of cells were prepared showing the concepts of the present invention. The sealing means employed was a polyphenylene sulfide plastic having approximately 40% by weight of fiberglass fill and approximately 20 by weight of polytetrafluroethylene fill. Cells were constructed employing this seal and a lithium-sulfur dioxide electrochemistry which had an electrolyte pressure of approximately 130 psi. Various batteries were stored at temperatures ranging from $-65°$ to $+165°$ F for substantial periods of time. Even with the use of extremely sensitive scales, there was no measurable weight loss during any of the storage tests. In addition, the seal was subjected to a helium leak rate check. The seal was effective in preventing leakage at less than $2 \times 10^{-8}$ cc per second.

Although the invention has been described and illustrated in detail, it is to be clearly understood that this is by way of illustration and example only and is not to be taken by way of limitation. The scope of the invention is limited only by the scope of the appended claims.

What is claimed is:

1. A terminal pin assembly for a battery, comprising:
   an elongated cylindrical pin having a first end for extension exterior of said battery and a second end for extension interior of said battery;
   header means forming one end of said battery and finding an opening through which said pin extends, said opening having a diameter larger than the first end of said pin;
   bracket means mounted on and extending inward from the interior surface of said header means, said bracket means having a diameter larger than said opening end said header; and
   sealing means mounted on said pin and having a diameter essentially equal to said bracket means, said bracket means being forceably enclosed about said sealing means.

2. The device of claim 1 wherein said cylindrical pin is made from a metal selected from the group consisting of aluminum and aluminum alloys.

3. The device of claim 2 wherein said sealing means comprises a toroid shaped member slideably mounted on said pin such that the innerdiameter of said toroid is essentially the same as said first end and the outer diameter of said toroid is essentially the same as the diameter of said bracket means.

4. The device of claim 3 wherein said toroid shaped member is a polyphenylene sulfide polymer.

5. The device of claim 4 wherein said polymer further includes from ten to sixty percent by weight of a fiberglass fill.

6. The device of claim 5 wherein said polymer further includes from about 10 to about 40 percent by weight of a polytetrafluroethylene fill.

7. In an electrochemical cell having a lithium anode and sulfur dioxide depolarizer, the improvement comprising:
   a terminal pin assembly for a battery having an elongated cylindrical pin with a first end for extension exterior of said battery and a second end for extension interior of said battery;
   header means forming one end of said battery and finding an opening through which said pin extends, said opening having a diameter larger than the first end of said pin;
   bracket means mounted on and extending inward from the interior surface of said header means, said bracket means having a diameter larger than said opening end said header; and
   sealing means mounted on said pin and having a diameter essentially equal to said bracket means, said bracket means being forceably enclosed about said sealing means.

8. The device of claim 7 wherein said cylindrical pin is made from a metal selected from the group consisting of aluminum and aluminum alloys.

9. The device of claim 8 wherein said sealing means comprises a toroid shaped member slideably mounted on said pin such that the innerdiameter of said toroid is essentially the same as said first end and the outer diameter of said toroid is essentially the same as the diameter of said bracket means.

10. The device of claim 9 wherein said toroid shaped member is a polyphenylene sulfide polymer.

11. The device of claim 10 wherein said polymer further includes from 10 to 60 percent by weight of a fiberglass fill.

12. The device of claim 11 wherein said polymer further includes from about 10 to about 40 percent by weight of a polytetrafluroethylene fill.

13. The device of claim 12 wherein said cell includes an electrolyte having electrolyte salts selected from the group consisting of lithium hexafluroarsenate and lithium bromide.

14. The device of claim 13 wherein the electrolyte solvent is selected from the group of sulfur dioxide and sulfur dioxide with a second organic solvent.

15. The device of claim 14 wherein said organic solvent is an acetonitrite.

* * * * *